June 6, 1944. O. B. FETTERMAN 2,350,676
BLACK-OUT SHIELD FOR VEHICLE HEADLIGHTS
Filed Sept. 10, 1942 4 Sheets-Sheet 3
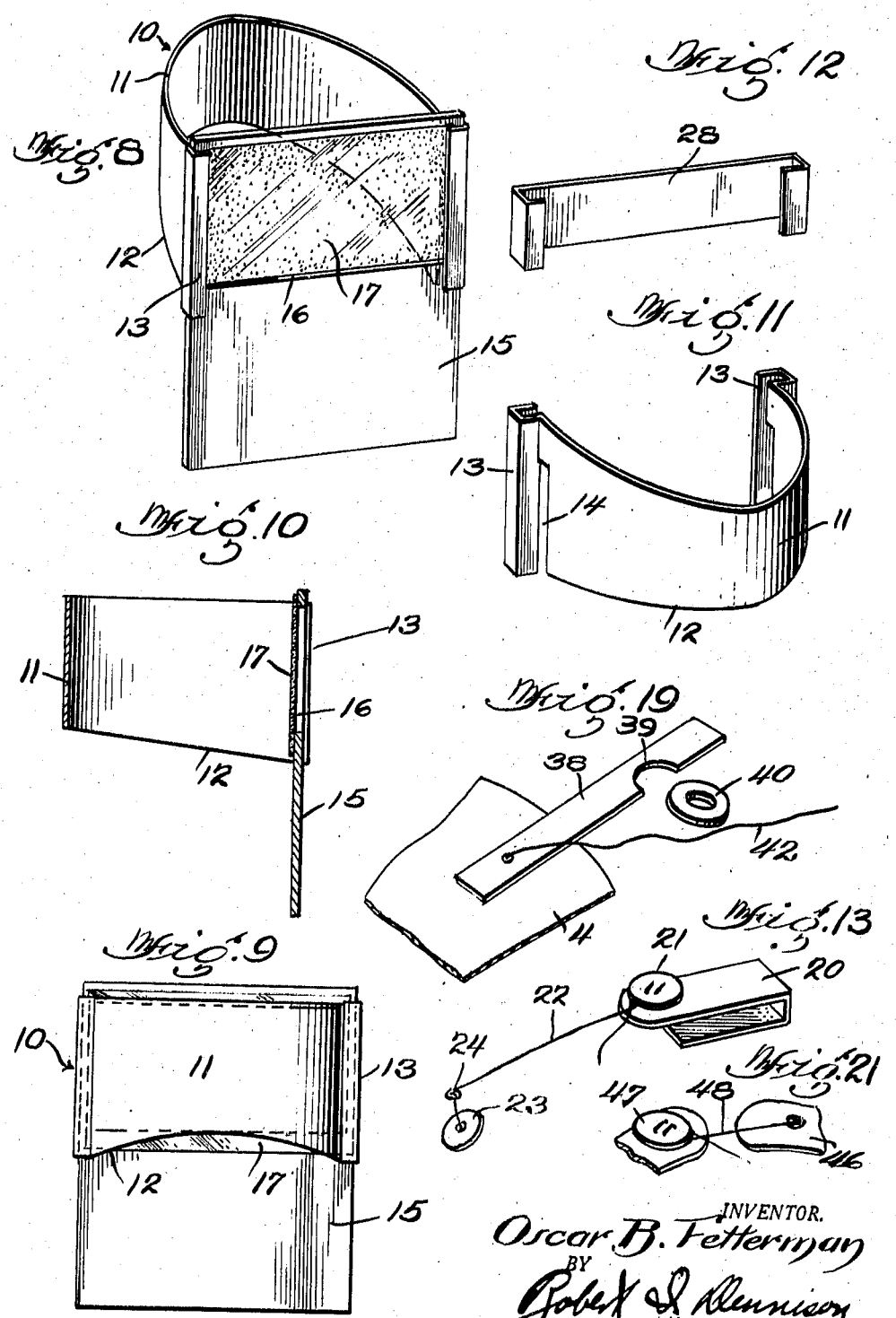
INVENTOR.
Oscar B. Fetterman
BY
Robert S. Dennison
ATTORNEY June 6, 1944.　　　O. B. FETTERMAN　　　2,350,676
BLACK-OUT SHIELD FOR VEHICLE HEADLIGHTS
Filed Sept. 10, 1942　　4 Sheets-Sheet 4
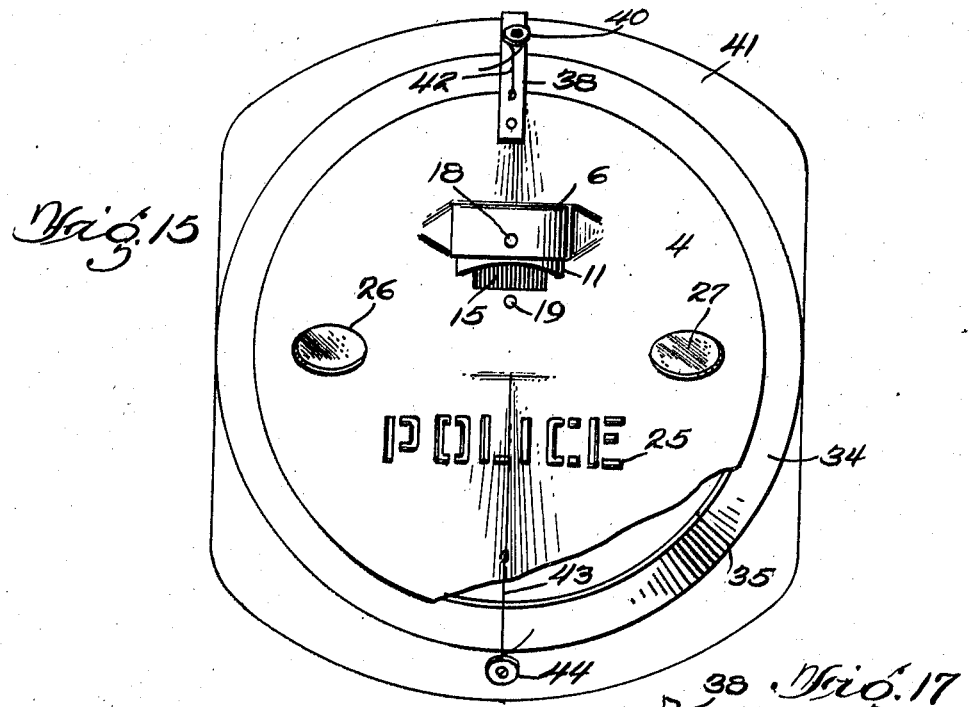
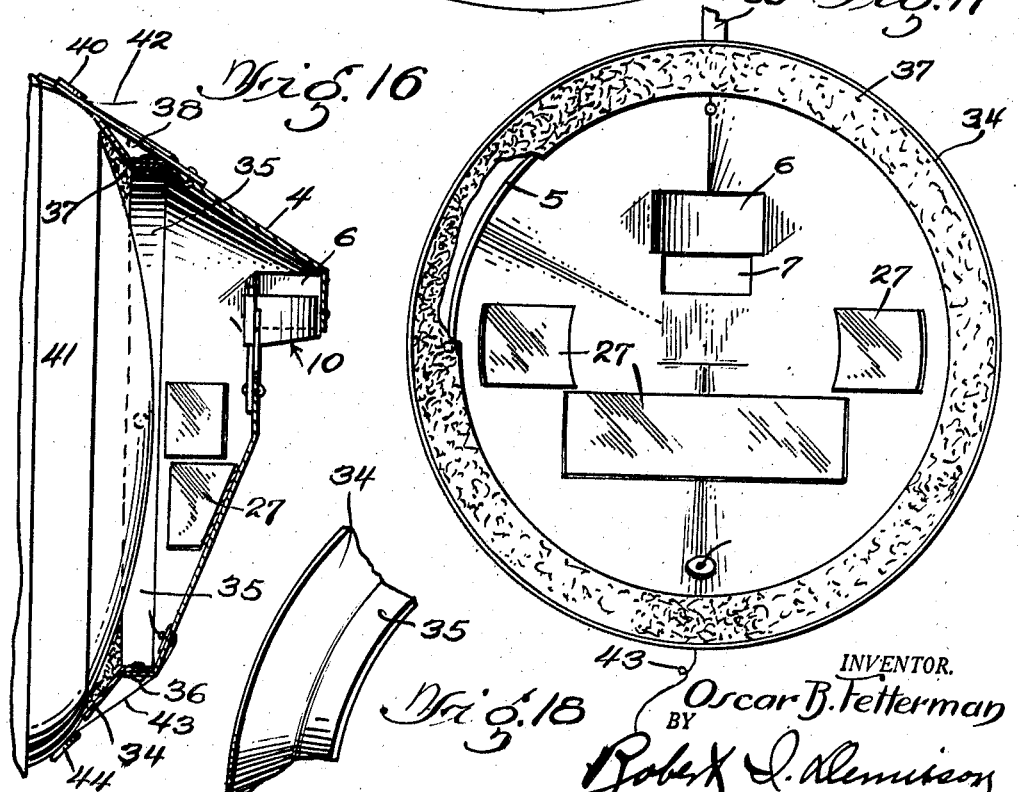
INVENTOR.
Oscar B. Fetterman
BY Robert J. Klennison
ATTORNEY Patented June 6, 1944

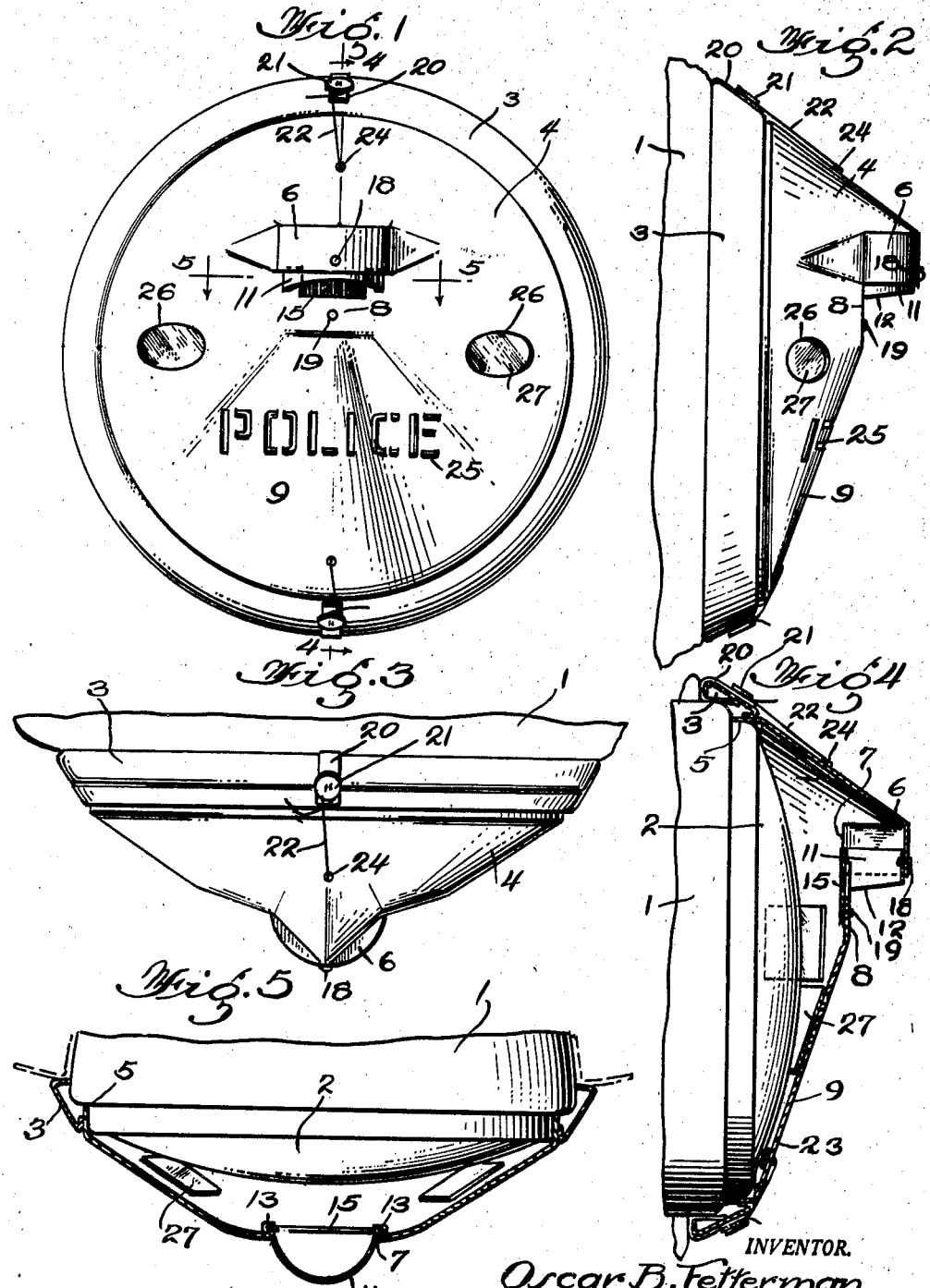

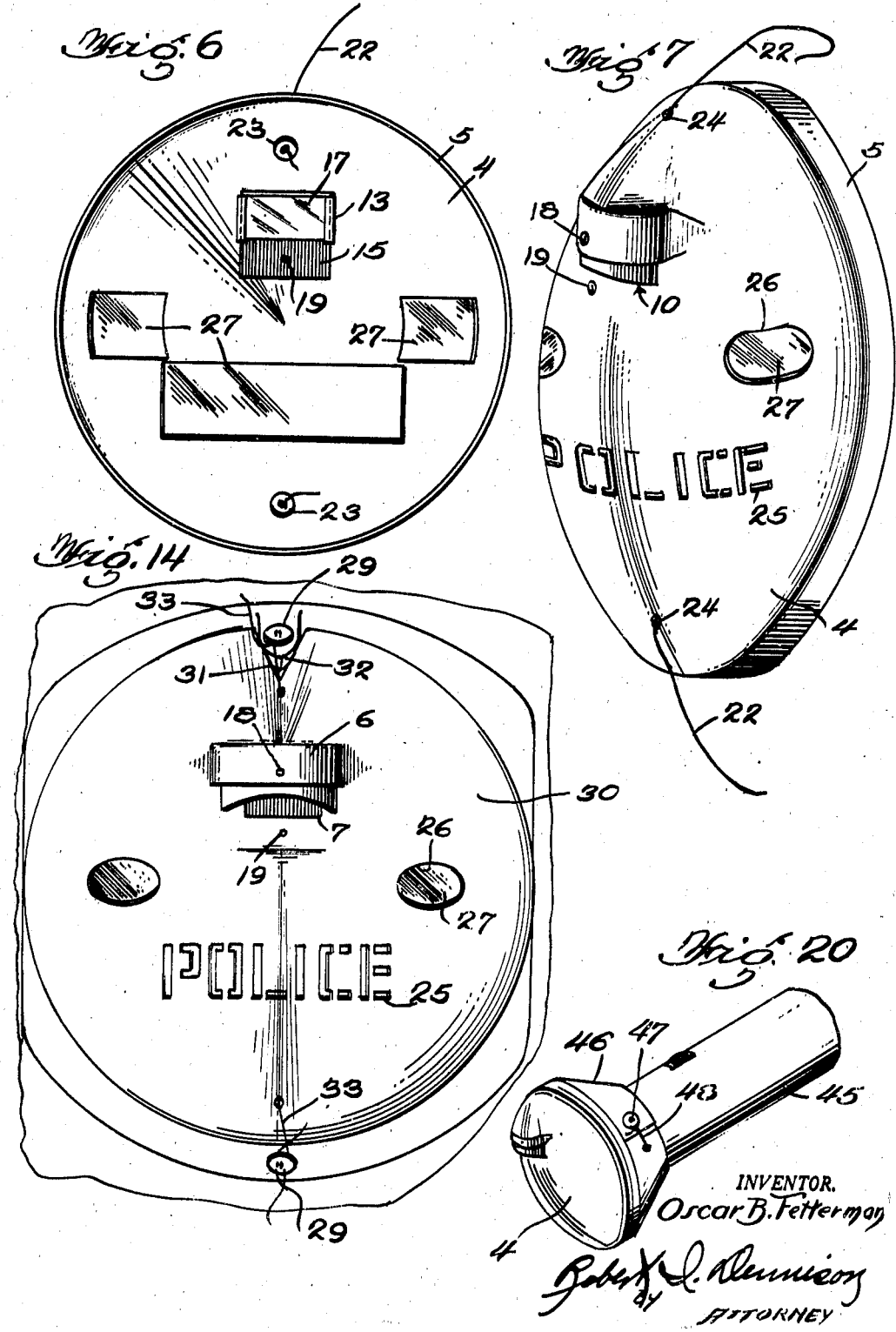

2,350,676

UNITED STATES PATENT OFFICE 2,350,676

BLACK-OUT SHIELD FOR VEHICLE HEADLIGHTS

Oscar B. Fetterman, Washington, D. C.

Application September 10, 1942, Serial No. 457,857

7 Claims. (Cl. 240—48.4)

The present invention relates to improvements in accessories for lamps and has reference more particularly to a black-out shield for vehicle headlights.

The primary object of the invention is to provide a black-out shield for use on the headlights of motor vehicles that are operated by duly authorized persons while operating the vehicle during a black-out, and which shield, when applied, will control the direction of the rays of light emanating from the light source in the headlight.

One of the important objects is to provide a black-out shield that will, when applied to the headlight, afford the driver of the vehicle adequate vision ahead, yet positively conceal the actual light source from the vision of persons in front of the device and at the same time exclude the projection of light so that it is not visible from above or at the sides.

A further object is to provide a device of the above mentioned character that can be readily and easily attached to the headlights without requiring any change or alterations to the headlights and one which may be easily and quickly removed from the headlights after the emergency has passed and stored in the vehicle where it will always be convenient when needed.

Another object of importance is to provide a black-out shield that is entirely constructed of non-critical material.

A still further and important object resides in the provision of a black-out shield for vehicle headlights that can be used on any type of headlight and further capable of adjustment to accommodate any beam of light projected from the light source of the headlight.

Another object is to provide a device of the above mentioned character that does not require the use of any tools to facilitate its attachment or removal and which can be applied in darkness without any difficulty and with dispatch.

Still further, the present invention embodies a black-out shield wherein a light shielding unit is employed, the latter being adjustable to any beam of light and when initially adjusted to the proper position will always assure proper control of projection of beam of light from headlights when the device is applied to headlights.

Another object is to provide the light shielding unit with a light diffuser for controlling the density of the light beams.

A further and important object of the invention resides in a novel fastening means employed for securing the device on the headlight.

A still further object is to provide a black-out shield that can be manufactured and sold at a very low cost and which will at all times be positive and efficient in carrying out the purposes for which it is designed.

Other objects and advantages will become apparent from the following description and accompanying drawings.

In the accompanying drawings forming a part of this specification and in which like numerals designate corresponding parts throughout the several views:

Figure 1 is a front elevation of the black-out shield showing the same mounted in an automobile headlight of the sealed beam type;

Figure 2 is a side elevation thereof;

Figure 3 is a top plan view;

Figure 4 is a vertical sectional view taken approximately on the line 4—4 of Figure 1;

Figure 5 is a horizontal section taken on the line 5—5 of Figure 1;

Figure 6 is a rear elevation of the black-out shield shown in Figure 1;

Figure 7 is a perspective view of the black-out shield;

Figure 8 is a detail perspective view of the light shielding unit forming a salient part of the present invention with the diffuser mounted thereon;

Figure 9 is a front elevation of the light shielding unit;

Figure 10 is a vertical sectional view through said unit and the diffuser;

Figure 11 is a detail perspective view of the arcuate band of the light shielding unit;

Figure 12 is a perspective view of the bar that is employed in lieu of the diffuser when a straight forward beam of light is to be projected;

Figure 13 is a perspective view of the fastening means employed for securing the device on the headlight;

Figure 14 is a view similar to Figure 1 illustrating a modified form of black-out shield and securing means when used with certain types of headlights;

Figure 15 is a front elevation of a still further modification of black-out shield;

Figure 16 is a vertical sectional view through the shield shown in Figure 15;

Figure 17 is a rear elevational view thereof with the light shielding unit removed;

Figure 18 is a fragmentary perspective view of the flanged ring forming a part of the device shown in Figures 15, 16 and 17;

Figure 19 is a perspective view of the fastening means employed in conjunction with the black-out shield shown in Figure 15;

Figure 20 is a perspective view of a flashlight equipped with my black-out shield, and Figure 21 is a perspective view of the means for securing the shield on the head of the flashlight.

In the drawings, and with reference more particularly to Figures 1 to 11, there is shown a black-out shield for use with headlights employing the well known sealed beam light.

The headlight housing is designated by the numeral 1, the lens at the forward end of the housing is shown at 2 and the retaining ring for the lens is illustrated at 3. It is, of course, understood that the usual light source and reflector is arranged within the headlight housing.

My improved black-out shield is preferably formed of non-critical material such as fiber, although I do not wish to limit myself to the particular material that may be used.

The shield comprises a substantially frusto-conical shaped hood 4. The open rear end of the hood is formed with an annular flange 5 that is adapted to be disposed around the lens frame and the retaining ring for the latter and the manner in which the black-out shield is secured on the headlight will hereinafter be more fully described.

The apex portion of the frusto-conical hood is designated at 6 and this peaked portion is rounded at the front as clearly shown in the drawings, although the exact shape of this peaked portion is immaterial.

The front face of the hood 4 is provided with an aperture 7 through which the light rays from the light source in the headlight are emitted. The peaked portion 6 is arranged over and above this opening 7 and the bottom of the peaked portion is open, the lower edge of the peaked portion being straight, as clearly shown in Figures 1, 2, 3 and 7.

It is to be understood, of course, that the opening 7 is formed in the hood so as to be in direct line with the beam of the light emanating from the light source. The portion of the hood directly below the opening 7 is straight or flat, as indicated at 8 and the lower portion 9 of the front wall of the hood is inclined rearwardly toward the bottom so that no reflecting surface is provided in the front wall of the hood below the light emitting opening 7.

Forming a salient part of this invention is the light shielding unit denoted generally by the numeral 10 in Figure 8.

The light shielding unit comprises a band 11, also of fiber. This band 11 is arcuate to conform to the inner contour of the peaked portion 6 of the hood. As is clearly shown in the drawings, the lower edge 12 of this band tapers gradually from the center of the band toward its respective free ends so that the band increases gradually in width from its forward central portion toward its rear ends.

The rear ends of the band are formed with vertically disposed channeled portions 13 that are open at their inner opposed sides, the purpose of which will be presently described. The band is further formed with slits 14 that extend upwardly from the lower edge adjacent the respective channeled portions as clearly shown in Figure 11.

The slits 14 permit the band 11 to have slidable engagement with the lower edge of the opening 7, with the channeled portions disposed against the inner face of the flat portion 8 of the front wall of the hood.

Cooperating with the band 11 is a fiber plate-like member 15, the same being mounted for slidable engagement with the channeled guides 13. The upper part of this fiber plate is formed with an opening 16 and secured over this opening is a diffuser element 17. This diffuser element is translucent and may comprise a piece of frosted glass, although I do not wish to be limited to the specific type of light diffuser that may be employed.

In assembling the light shielding unit on the hood, the diffuser element carrying member is first positioned in the channeled guides 13 and then the unit is positioned over the lower edge of the light emitting opening 7, with the band fitting against the inner wall of the peaked portion 6. The unit is then vertically adjusted while on the hood to position the light shielding unit in proper focus with the beam of light projected. After the unit has been adjusted to the proper position, the unit is secured in a fixed position by the rivets 18 and 19.

By initially adjusting the light shielding unit on the hood, it will not be necessary for the ultimate user of the black-out shield to make any further adjustments of the unit when installing the shield on the headlights.

With reference now to the novel securing means employed for holding the black-out shield on the headlight, attention is directed to Figures 1, 3, 4, 6, 7 and 13.

A fiber tab 20, bent to engage around the rear edge of the lens retaining ring 3 carries at its exposed free end portion, the button 21. A cord 22 having a button 23 secured at its inner end passes through a suitable opening provided therefor in the hood and the free end of this cord is adapted to be wound around the button 21.

Two of such cooperating fastening means are employed one at the top and one at the bottom of the hood and lens retaining ring. The buttons 23 are disposed against the inner face of the hood and cover over the openings through which the cords 22 pass and a knot 24 is formed in each cord for disposition against the top face of the hood over the cord opening to prevent any light from emitting therethrough.

It is to be understood that when installing the black-out shield on the headlight, the retaining means for the ring 3 is loosened to permit the insertion of the tab 20 around the rear edge of the ring and when once in place, the tab 20 need not be removed from the headlight and these tabs will not present any unsightly appearance and will at all times be ready for use.

The hood is provided with suitable identification cut out indicia 25 in the portion 9. In the present instance, the indicia designates "police." However, any other identifying indicia may be employed, depending on the use of the vehicle equipped with my black-out shield.

Side openings 26 of oval shape are formed in the hood so that drivers of vehicles or persons approaching the vehicle equipped with the black-out shield from the side may readily distinguish the vehicle. The openings 25 and 26 are preferably covered on their inner faces with red colored Cellophane strips 27 that are adhesively secured to the inner face of the hood.

The black-out shield is preferably painted black so that no reflecting surfaces are produced. When the device is to be used during a black-out or darkness, the user merely places the hood and the previously properly adjusted light shielding unit carried thereby over the lens of the headlight and the flange 5 of the hood will fit between the ring 3 and the lens retaining frame. The cords 22 are then tied around the top and bottom buttons 21 and thereby the device is securely held in place and properly positioned on the headlight.

With the black-out shield attached to the headlight, the beam of light that is projected from the light source in the headlight will be deflected downwardly onto the ground in front of the vehicle by the light shielding unit and the projected light will further be diffused by reason of the diffuser element associated with the unit. Thus, the operator of a vehicle equipped with my improved black-out shield can safely travel in the dark with sufficient vision ahead. At the same time, the actual light source will not be visible to persons in front of the vehicle. No light can be seen from the horizontal plane of the beam, or from any angle above the horizontal plane.

When it is desired to obtain a straight forwardly projected beam of light, the diffuser element is removed and the bar 28 shown in Figure 12 is employed. This bar 28 coacts with the band 11 to cause the beam of light to be projected straight ahead and not directly onto the ground.

The light shielding unit, by reason of its adjustability, may vary the area of the projected beam of light and the direction of the beam will at all times be controlled. By using different types of diffusers, the density of the light may be controlled.

The black-out shield hereinabove described is adapted for use in conjunction with headlights of the sealed beam type.

In other types of headlights, a modified form of shield must be employed. In Figure 14 there is shown a black-out shield embodying the same features as are present in the form of shield shown in Figure 1, with the exception that in lieu of employing button carrying tabs that engage around the rear edge of the lens frame retaining ring, the buttons 29 are attached directly over the screws that fasten the lens retaining ring.

The hood 30 is formed with a V-shaped notch 31 in the upper edge of the central portion to accommodate the projecting portion 32 of the lens ring or frame and the cord 33 carried by the hood wraps around the button 29.

A still further modification of shield is necessary for use with other types of headlights. In this respect, attention is now directed to Figures 15, 16, 17 and 18 of the drawings. Here again, the same construction of hood and light shielding unit as shown in Figures 1 to 6, inclusive, is used. A flared fiber ring 34 is formed with an annular collar 35 at its forward edge and the flanged portion 5 of the hood encircles the collar 35 and is fixedly secured thereto as at 36.

The inner face of the flared fiber ring 34 is coated with flocking 37 so that the ring, when applied to a headlight, will not mar any polished surface or the lens.

With this type of black-out shield, a modification of the top fastening means is employed. A fiber strip 38 is attached at its lower end portion to the hood. The outer free end portion of this fiber strip 38 is adapted to overlie the flared ring 34 and is formed in one side edge with a notch 39 to engage around the button 40, the latter being secured on the screw that holds the lens retaining ring 41 of the headlight. A cord 42 associated with the strip 38 has its free end wrapped around the top button 40. The lower central portion of the hood is secured on the headlight by the cord 43 and coacting button 44.

In Figure 20, I have illustrated the use of my black-out shield upon a flashlight 45. The flange 5 of the hood is disposed around the head of the flashlight, and a fiber band 46 encircles the rear portion of the hood and the head of the flashlight. A button 47 is carried by one free end of the band while a cord 48 is attached to the other free end of this band. By wrapping the cord around the button, the band 46 will securely hold the shield over the front face of the lens of the flashlight.

While I have shown the hood securing means as comprising coacting cords and buttons, any other suitable fastening means may be employed.

It will thus be seen from the foregoing description that I have provided a black-out shield for vehicle headlights that can be readily and easily attached and removed, without the use of any tools, or necessitating any modifications or alterations in the conventional headlight structures now in use. Further, the shield is adapted to fit all sizes of headlights and after the light shielding unit has once been adjusted to the proper beam, no further adjustments are necessary and the user can install the device in the dark.

Due to its simplicity, my device can be manufactured and sold very inexpensively and the use of all critical materials is obviated. The device will be strong and durable and at all times positive and efficient in carrying out the purposes for which it has been designed.

Not only can the device be used on automobiles, but the same can be used in connection with any light where it is desired to control the projection of the beam of light from the light source.

The black-out shield may be used on both headlights or if desired, one of the shields may be used on the left headlight and the right headlight may be completely covered by a hood that is not provided with light emitting openings.

Likewise, the rear lights of an automobile may be equipped with similar black-out shields.

While I have shown the preferred embodiment of my invention, it is to be understood that various changes in the size, shape and arrangement of parts may be resorted to without departing from the spirit of the invention and the scope of the appended claims.

Having thus described my invention, what I claim is:

1. In combination with a vehicle headlight having a reflector housing adapted to enclose a light source therein and a lens at the forward end of the housing; a hood mounted in front of the lens, said hood having an opening in the front side thereof through which a beam of light from the light source is emitted, the portion of the hood above the opening extending forwardly and downwardly forming a peaked portion that is open at its bottom, and a light shielding unit arranged within the peaked portion, said light shielding unit projecting through the open bottom of the peaked portion and cooperating with said light emitting opening to regulate the projection of the beam of light therethrough.

2. In combination with a vehicle headlight having a reflector housing adapted to enclose a light source therein and a lens at the forward end of the housing; an opaque hood arranged in front of the lens, said hood having an opening in the front side through which a beam of light from the light source is emitted, the portion of the hood directly above the opening being peaked, an initially vertically adjustable light shielding member mounted within the peaked portion of the hood for regulating the projection of the beam of light through the opening in the hood, said member comprising a band fitting against the inner wall of the peaked portion.

3. In combination with a vehicle headlight having a reflector housing adapted to enclose a light source therein and a lens at the forward end of the housing; an opaque hood arranged in front of the lens, said hood having an opening in the front side through which a beam of light from the light source is emitted, the portion of the hood directly above the opening being peaked, an initially vertically adjustable light shielding member mounted within the peaked portion of the hood for regulating the projection of the beam of light through the opening in the hood, said member comprising a band fitting against the wall of the peaked portion, the rear portion of the band being open to cooperate with the opening in the hood.

4. In combination with a vehicle headlight having a reflector housing adapted to enclose a light source therein and a lens at the forward end of the housing; an opaque hood arranged in front of the lens, said hood having an opening in the front side through which a beam of light from the light source is emitted, the portion of the hood directly above the opening being peaked, an initially vertically adjustable light shielding member mounted within the peaked portion of the hood for regulating the projection of the beam of light through the opening in the hood, said member comprising a band fitting against the inner wall of the peaked portion, the rear portion of the band being open to cooperate with the opening in the hood, the rear free ends of the band having initial slidable engagement with the lower edge portion of the opening in the hood.

5. In combination with a vehicle headlight having a reflector housing adapted to enclose a light source therein and a lens at the forward end of the housing; an opaque hood arranged in front of the lens, said hood having an opening in the front side through which a beam of light from the light source is emitted, the portion of the hood directly above the opening being peaked, an initially vertically adjustable light shielding member mounted within the peaked portion of the hood for regulating the projection of the beam of light through the opening in the hood, said member comprising a band fitting against the inner wall of the peaked portion, the rear portion of the band being open to cooperate with the opening in the hood, the rear free ends of the band having initial slidable engagement with the lower edge portion of the opening in the hood, and a light diffuser element carried by the rear free ends of the band for disposition over the opening in the path of the beam of light emanating from said light source.

6. In combination with a vehicle headlight having a reflector housing adapted to enclose a light source therein and a lens at the forward end of the housing; an opaque hood arranged in front of the lens, said hood having an opening in the front side through which a beam of light from the light source is emitted, the portion of the hood directly above the opening being peaked, an initially vertically adjustable light shielding member mounted within the peaked portion of the hood for regulating the projection of the beam of light through the opening in the hood, said member comprising a band fitting against the inner wall of the peaked portion, the rear portion of the band being open to cooperate with the opening in the hood, the rear free ends of the band having initial slidable engagement with the lower edge portion of the opening in the hood, and a light diffuser element carried by the rear free ends of the band for disposition over the opening in the path of the beam of light emanating from said light source, said band gradually increasing in width from its forward central portion toward its respective rear free ends.

7. In combination with a vehicle headlight having a reflector housing adapted to enclose a light source therein and a lens at the forward end of the housing; a hood mounted in front of the lens, said hood having an opening in its front side through which a beam of light from the light source is emitted, the portion of the hood above the opening extending forwardly and downwardly forming a peaked portion that is open at its bottom, a light shielding unit arranged within the peaked portion, said light shielding unit projecting through the open bottom of the peaked portion, and cooperating with said light emitting opening to regulate the projection of the beam of light therethrough, and a light diffuser element carried by the light shielding unit for disposition across the light emitting opening in the hood.

OSCAR B. FETTERMAN.